United States Patent
Kubonoya

[11] Patent Number: 6,129,424
[45] Date of Patent: Oct. 10, 2000

[54] OVER-STEERING INHIBITING CONTROL SYSTEM FOR A VEHICLE

[75] Inventor: Hideki Kubonoya, Wako, Japan

[73] Assignee: Honda Giken Kogyo Kabushiki Kaisha, Tokyo, Japan

[21] Appl. No.: 09/144,629

[22] Filed: Aug. 31, 1998

[30] Foreign Application Priority Data

Sep. 3, 1997 [JP] Japan ................................. 9-238322

[51] Int. Cl.⁷ ........................................................ B60T 8/58
[52] U.S. Cl. ............................................ 303/146; 303/147
[58] Field of Search ................................... 303/146–150

[56] References Cited

U.S. PATENT DOCUMENTS

| | | | |
|---|---|---|---|
| 4,881,785 | 11/1989 | Ushijima et al. | 303/146 |
| 4,917,444 | 4/1990 | Ishido et al. | 303/146 |
| 5,341,297 | 8/1994 | Zomotor et al. | 303/146 |
| 5,702,165 | 12/1997 | Koibuchi | 303/146 |
| 5,915,800 | 6/1999 | Hiwatashi et al. | 303/146 |

FOREIGN PATENT DOCUMENTS 2-70561  3/1990  Japan.

Primary Examiner—Matthew C. Graham
Attorney, Agent, or Firm—Armstrong, Westerman, Hattori, McLeland & Naughton

[57] ABSTRACT

The over-steering inhibiting control-continued state is clocked by a clocking device with a counting value per one run determined depending upon the control mode established by a control mode switching-over device. When the counting value reaches a preset time of the clocking device, even during continuation of the over-steering inhibiting control operation, the over-steering inhibiting control operation is forcibly discontinued by a control discontinuation determining device.

6 Claims, 3 Drawing Sheets

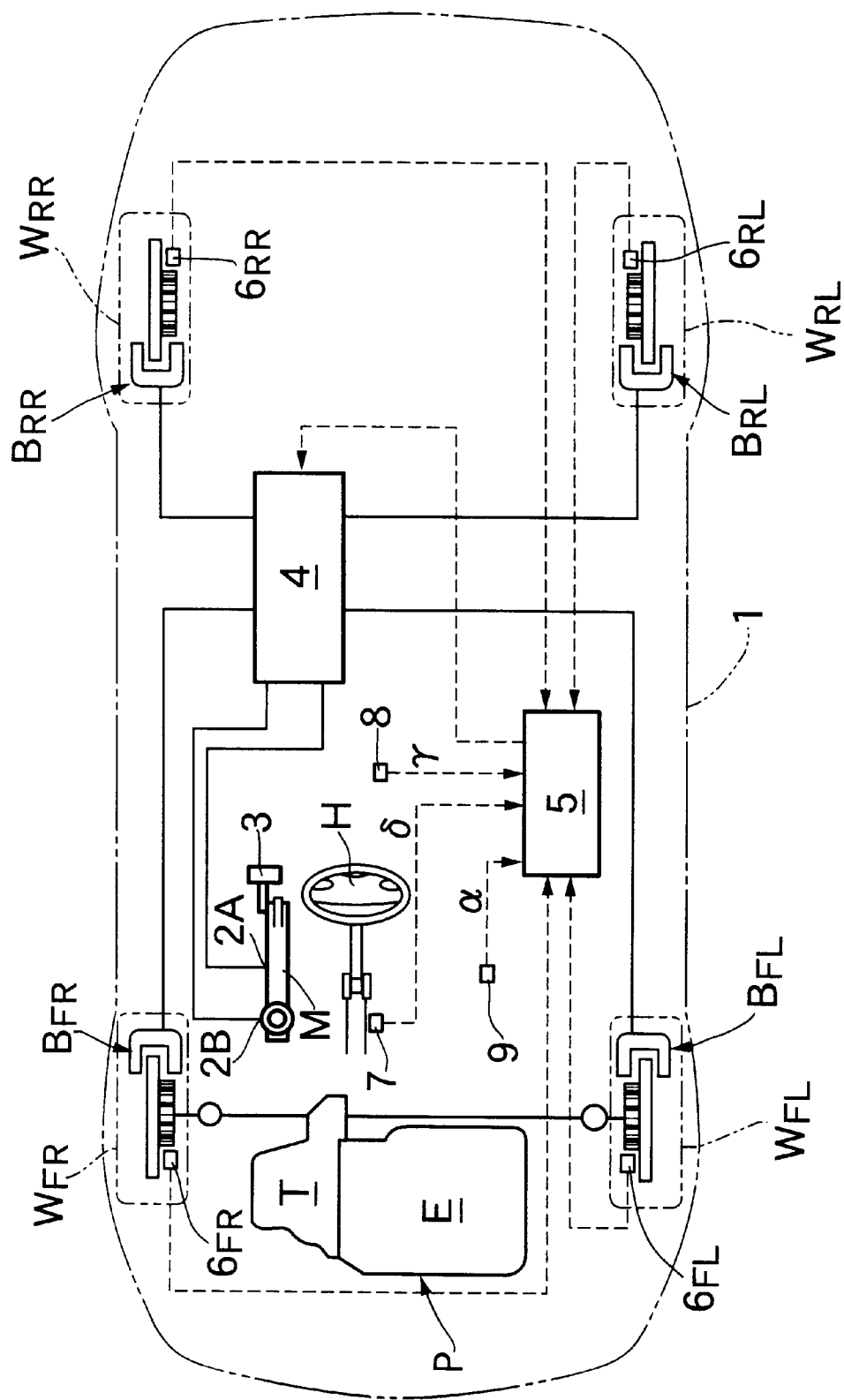

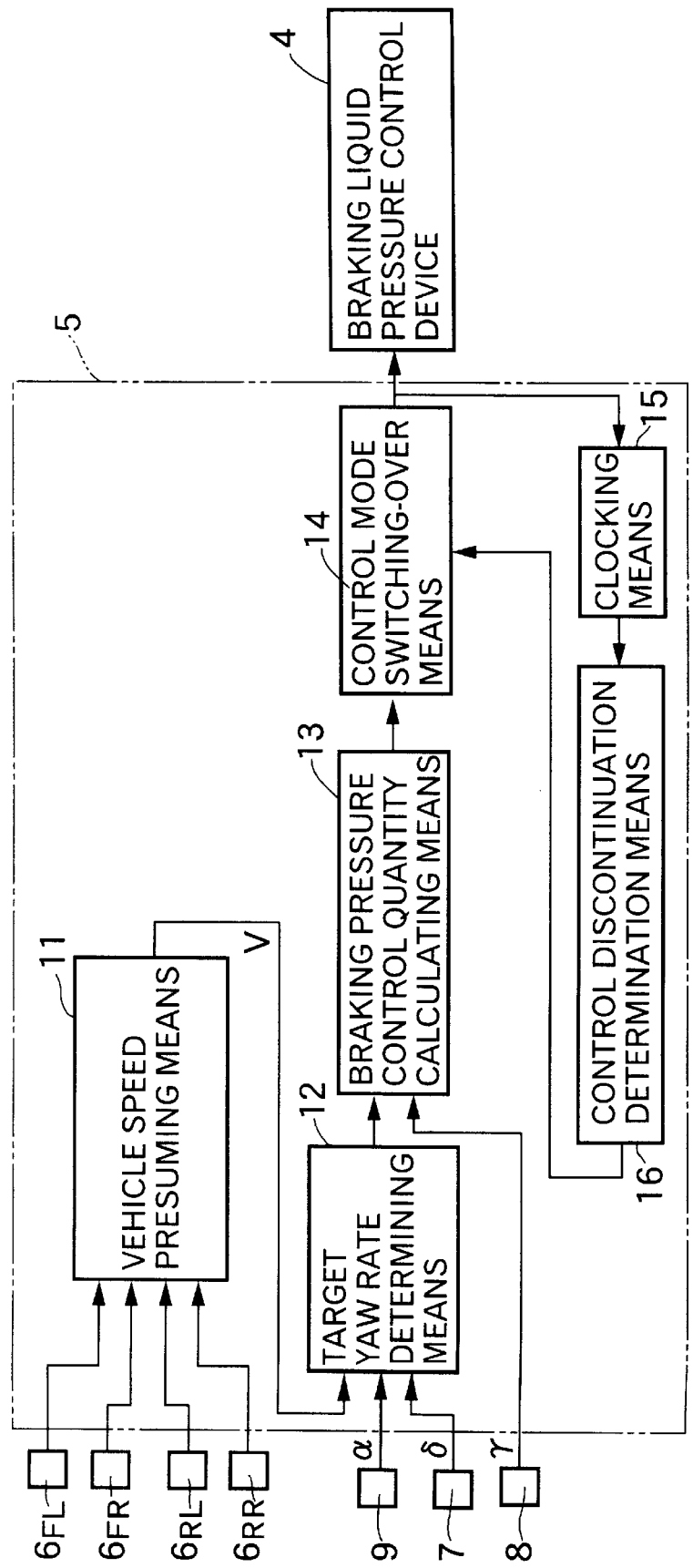

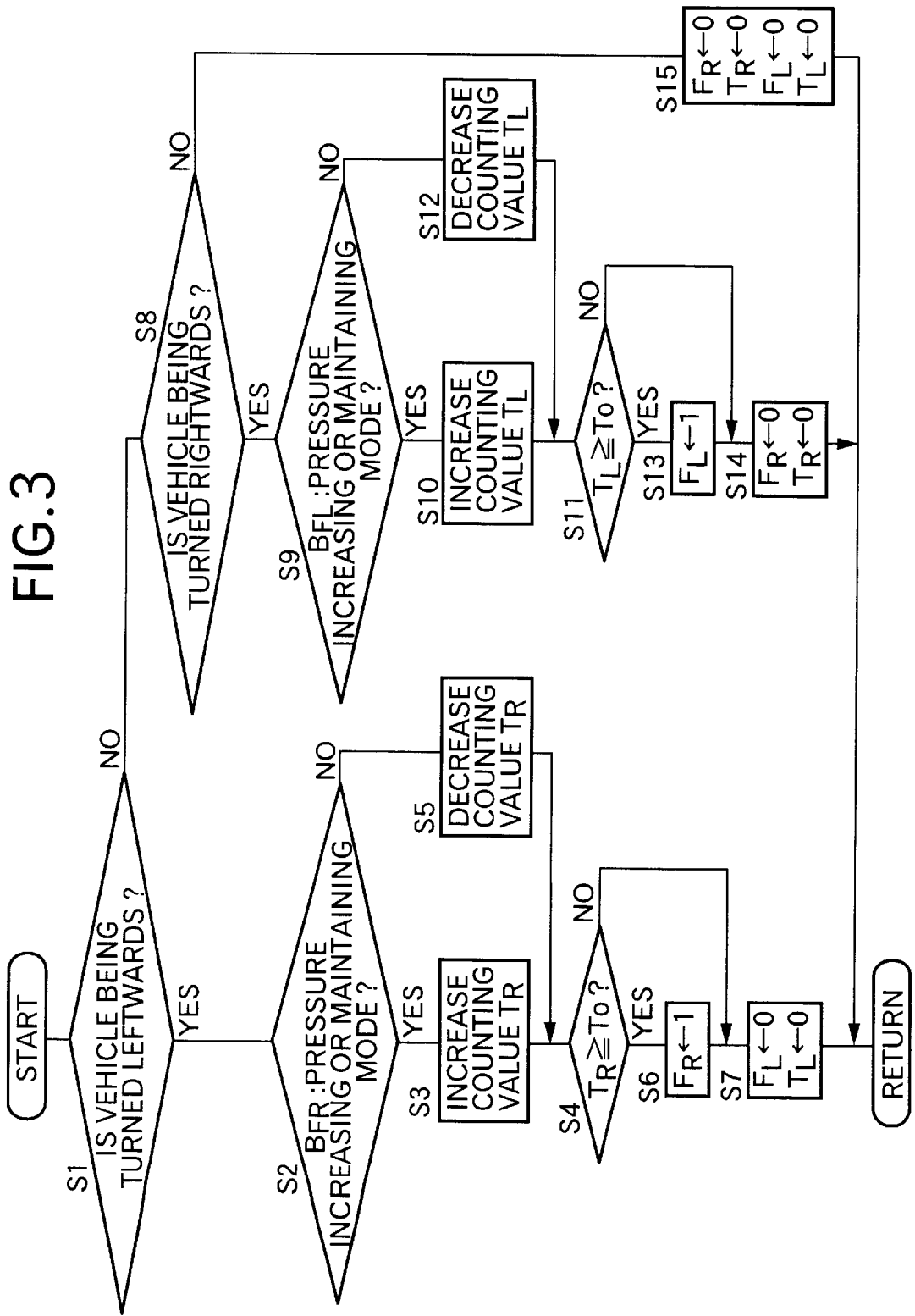

OVER-STEERING INHIBITING CONTROL SYSTEM FOR A VEHICLE

BACKGROUND OF THE INVENTION

1. Field of the Invention

The present invention relates to an over-steering inhibiting control system for a vehicle for inhibiting an over-steering of the vehicle.

2. The Related Art

An over-steering inhibiting control system is conventionally known, for example, from Japanese Patent Application Laid-open No.2-70561 or the like, which is designed to inhibit an over-steering by exhibiting a braking force for an outer wheel (as viewed during turning of the vehicle), when the vehicle is in an over-steered state.

However, when the vehicle is turned far inwards in a turning direction in the over-steered state, the over-steered state may sometimes not be eliminated despite the braking force being exhibited for the outer wheel. In such a situation, the wheel brake for the outer wheel (as viewed during turning of the vehicle) remains operated in the conventional system, even though no over-steering inhibiting effect is being obtained, thus constituting an excessive control. In other situations, the driver may steer a steering wheel in an outward direction (as viewed during turning of the vehicle) during the over-steered state. Even in such case, if the braking force is exhibited for the outer wheel (as viewed during turning of the vehicle), there is a possibility that a phenomenon of non-swinging of the vehicle head may be produced.

SUMMARY OF THE INVENTION

The present invention has been accomplished in view of the above circumstances, and it is an object of the present invention to provide an over-steering inhibiting control system for a vehicle, wherein an excessive over-steering inhibiting control operation can be avoided.

It is another object of the present invention to avoid an excessive over-steering inhibiting control operation in an over-steering inhibiting control system for a vehicle, wherein the braking pressure for a wheel brake for an outer (as viewed during turning of the vehicle) one of left and right wheel brakes is controlled with pressure increasing, maintaining and decreasing modes being switched over from one to another.

To achieve the above and other objects, there is provided an over-steering inhibiting control system for a vehicle, comprising a yaw rate sensor for detecting a yaw rate of the vehicle, a target yaw rate determining means for determining a target yaw rate, a braking pressure control quantity calculating means for calculating a braking pressure control quantity for a wheel brake for an outer as viewed during turning of the vehicle one of left and right wheel brakes, based on the target yaw rate obtained in the target yaw rate determining means and the yaw rate detected by the yaw rate sensor, when the vehicle has been brought into an over-steered state, and a control mode switching-over means for switching over the braking pressure increasing, maintaining and decreasing modes from one to another based on the control quantity obtained in the braking pressure control quantity calculating means to control the braking pressure for the wheel brake for the outer wheel as viewed during turning of the vehicle, wherein the over-steering inhibiting control system includes a clocking means for clocking the state of continuation of the over-steering inhibiting control operation with a counting value per one run determined depending upon the control mode established by the control mode switching-over means, and a control discontinuation determining means for forcibly discontinuing the over-steering inhibiting control operation in response to the counting value of the clocking means reaching a preset time, even when the over-steering inhibiting control operation is being continued.

The time of continuation of the over-steering inhibiting control operation is long when no over-steering inhibiting effect is obtained. The excessive over-steering inhibiting control operation can be avoided by discontinuing the over-steering inhibiting control operation in response to the counting value of the clocking means for clocking the over-steering inhibition-controlled state reaching the preset time. Moreover, the state in which the control mode switching-over means has brought the braking pressure control mode for the wheel brake for the outer wheel (as viewed during turning of the vehicle) into the pressure increasing or maintaining mode, is a state in which the braking force is exhibited for the outer wheel. When the control mode is the pressure decreasing mode, the braking force for the outer wheel is being exhibited on the basis of an understanding that the over-steered state is being eliminated. The clocking means clocks the state of continuation of the over-steering inhibiting control-continued state with a counting value per one run determined depending upon the control mode and hence, the preset time is determined substantially depending upon the degree of the over-steering inhibiting effect. Thus, it is possible to more effectively prevent the excessive over-steering inhibiting control operation.

In addition to the features described above, the clocking means decreases the counting value a predetermined value by a predetermined value in response to the control mode switching-over means bringing the braking pressure control mode into the pressure decreasing mode. With such arrangement, even if the braking pressure control mode is brought into the pressure increasing or maintaining mode again after the braking pressure control mode has been temporarily brought into the pressure decreasing mode with the counter-steering operation carried out by the driver in the over-steered state, it is avoided that the over-steering inhibiting control operation is immediately discontinued, because the counting value clocked in the state of the pressure increasing or maintaining mode is being decreased until the control mode is brought into the pressure decreasing mode. Thus, it is possible to prevent the over-steering inhibiting control operation from being frequently discontinued due to a variation in yaw rate caused by the counter-steering operation.

BRIEF DESCRIPTION OF DRAWINGS

FIG. 1 is an illustration of a driving system and a braking system in a vehicle.

FIG. 2 is a block diagram of components for an over-steering inhibiting control for a control unit.

FIG. 3 is a flow chart showing a procedure for determining the discontinuation of the over-steering inhibiting control.

DETAILED DESCRIPTION OF THE PREFERRED EMBODIMENT

The mode for carrying out the present invention will be described by way of a preferred embodiment and as shown in the accompanying drawings.

FIGS. 1 to 3 show a preferred embodiment of the present invention. FIG. 1 is an illustration of a driving system and a braking system in a vehicle; FIG. 2 is a block diagram of components for an over-steering inhibiting control for a control unit; FIG. 3 is a flow chart showing a procedure for determining the discontinuation of the over-steering inhibiting control.

Referring first to FIG. 1, this vehicle is a front engine and front drive vehicle. A power unit P comprising an engine E and a transmission T is mounted at a front portion of a vehicle body 1 to drive left and right front wheels $W_{FL}$ and $W_{FR}$ which are left and right driving wheels. Left and right front wheel brakes $B_{FL}$ and $B_{FR}$ are mounted on the left and right front wheels $W_{FL}$ and $W_{FR}$, and left and right rear wheel brakes $B_{RL}$ and $B_{RR}$ are mounted on left and right rear wheels $W_{RL}$ and $W_{RR}$ which are left and right follower wheels. Each of the wheel brakes $B_{FL}$, $B_{FR}$, $B_{RL}$ and $B_{RR}$ is, for example, a disk brake.

A braking liquid pressure corresponding to a depression of a brake pedal 3 is outputted from first and second output ports 2a and 2b provided in a tandem-type master cylinder M. The first and second output ports 2A and 2B are connected to a braking liquid pressure control device 4, so that the braking liquid pressure from the braking liquid pressure control device 4 is applied to the wheel brakes $B_{FL}$, $B_{FR}$, $B_{RL}$ and $B_{RR}$. In the braking liquid pressure control device 4, the braking fluid pressure applied to each of the wheel brakes $B_{FL}$, $B_{FR}$, $B_{RL}$ and $B_{RR}$ is controlled by a control unit 5. Inputted to the control unit 5 are detection values which are generated by wheel speed sensors $6_{FL}$, $6_{FR}$, $6_{RL}$ and $6_{RR}$ which detect wheel speeds of the wheels $W_{FL}$, $W_{FR}$, $W_{RL}$ and $W_{RR}$, respectively, a steering angle sensor 7 which detects a steering angle δ resulting from the operation of a steering wheel H, a yaw rate sensor 8 which detects a yaw rate γ of the vehicle, and a lateral acceleration sensor 9 which detects a lateral acceleration α of the vehicle.

The control unit 5 is capable of carrying out, (1) an antilock brake control for controlling the braking liquid pressures for the wheel brakes $B_{FL}$, $B_{FR}$, $B_{RL}$ and $B_{RR}$ to eliminate the locking of the wheels during a braking operation, (2) a traction control for controlling the braking liquid pressures for the left and right front wheel brakes $B_{FL}$ and $B_{FR}$ to inhibit the generation of excessive slipping of the left and right front wheels $W_{FL}$ and $W_{FR}$ during non-braking operation, and (3) a directional stability control for controlling the braking liquid pressures for the left and right front wheel brakes $B_{FL}$ and $B_{FR}$ irrespective of the braking and non-braking operations to control the yaw motion of the vehicle.

In order to carry out the over-steering inhibiting control operation in the directional stability control, the control unit 5 includes a vehicle speed presuming means 11 for presuming a vehicle speed V, a target yaw rate determining means 12 for determining a target yaw rate, a braking pressure control quantity calculating means 13 for calculating a braking pressure control quantity for an outer one of the left and right wheel brakes $B_{FL}$ and $B_{FR}$ (as viewed during turning of the vehicle), when the vehicle has been brought into an over-steered state, a control mode switching-over means 14 for switching over the braking-pressure increasing, maintaining and decreasing modes from one to another based on the control quantity obtained in the braking pressure control quantity calculating means 13 to control the operation of the braking liquid pressure control device 4 to control the braking pressure for the wheel brake for the outer wheel (as viewed during turning of the vehicle), a clocking means 15 for clocking the state of continuation of the over-steering inhibiting control intended to control the braking pressure for the wheel brake for the outer wheel, and a control discontinuation determining means 16 for forcibly discontinuing the over-steering inhibiting control operation in response to the fact that the counting value of the clocking means 15 becomes equal to or larger than a preset time.

The vehicle speed presuming means 11 calculates a presumed vehicle speed V based on the wheel speeds of at least the left and right follower speeds, i.e., the wheel speeds of the left and right rear wheels $W_{RL}$ and $W_{RR}$, e.g., the wheel speeds of all the wheels $W_{FL}$, $W_{FR}$, $W_{RL}$ and $W_{RR}$ in this embodiment. Inputted to the target yaw rate determining means 12 are the presumed vehicle speed V obtained in the vehicle speed presuming means 11, the steering angle δ detected by the steering angle sensor 7, and the lateral acceleration α detected by the lateral acceleration sensor 9. In the target yaw rate determining means 12, a target yaw rate γG is determined according to the following calculating equation:

$$\gamma G = (\alpha/V) \cdot k$$

wherein k is a constant of different values in correspondence to the steering angle δ. In order to compensate for a reduction in reliability of the lateral acceleration α detected by the lateral acceleration sensor 9 due to an inclination of a travel road surface or the like, the above constant k is determined based on the steering angle δ.

In the braking pressure control quantity calculating means 13, a braking pressure control quantity for the outer wheel (as viewed during turning of the vehicle) at the time when the vehicle has been brought into the over-steered state, is determined based on the target yaw rate γG obtained in the target yaw rate determining means 12 and the yaw rate γ detected by the yaw rate sensor 8. Upon over-steering in a leftward turning state, a braking pressure for the right front wheel brake $B_{FR}$ is increased by the braking pressure control quantity calculating means 13. Upon over-steering in a rightward turning state, a braking pressure for the left front wheel brake $B_{FL}$ is increased by the braking pressure control quantity calculating means 13. The determination of whether the vehicle has been brought into the over-steered state is based on the target yaw rate γG obtained in the target yaw rate determining means 12 and the yaw rate γ detected by the yaw rate sensor 8. For example, when a value resulting from the subtraction of the target yaw rate γG from the detected yaw rate γ is increased, or when the detected yaw rate γ is increased to a value larger than the target yaw rate γG, it is determined that the vehicle has been brought into the over-steered state.

The clocking operation in the clocking means 15 when the vehicle is in the over-steered state, and the discontinuation determining operation in the control discontinuation determining means 16, are established as shown in FIG. 3. At Step S1 in FIG. 3, it is determined whether the vehicle is being turned leftwards. If the vehicle is being turned leftwards, then it is determined at Step S2 whether the braking pressure control mode for the right front wheel brake $B_{FR}$ is the pressure increasing mode or the pressure maintaining mode. If the braking pressure control mode is the pressure increasing mode or the pressure maintaining mode, then the counting value $T_R$ for discontinuing the control for the right front wheel is increased, for example, by 5 msec in the clocking means 15 at Step S3. Namely, the clocking means 15 clocks the over-steering inhibiting control-continued state with the counting value per one run being determined at 5 msec, when the control mode is the pressure increasing mode or the pressure maintaining mode by the control mode switching-over means 14.

At Step S4, it is confirmed whether the counting value $T_R$ for discontinuing the control for the right front wheel has become equal to or larger than a preset value $T_0$. Here, the preset time $T_0$ is set as a time for ascertaining the fact that a sufficient over-steering inhibiting effect is not obtained even by increasing or maintaining the braking pressure, for example, at 800 msec.

On the other hand, when it is determined at Step S2 that the braking pressure control mode for the right front wheel brake $B_{FR}$ is not the pressure increasing mode or the pressure maintaining mode, i.e., when the braking pressure control mode for the right front wheel brake $B_{FR}$ is the pressure decreasing mode, the counting value $T_R$ for discontinuing the control for the right front wheel is decreased, for example, by 1 msec by the clocking means 15, progressing to Step S4. Namely, the clocking means 15 clocks the over-steering inhibiting control-continued state with the counting value per one run being determined at −1 msec, when the control mode switching-over means 14 has switched over the control mode to the pressure decreasing mode.

When it is determined at Step S4 that $T_R \geq T_0$, a right front wheel-side control discontinuing flag $F_R$ is set at "1" at Step S6. More specifically, the over-steering inhibiting control by the right front wheel brake $B_{FR}$ during leftward turning of the vehicle is discontinued, and at Step S7, a left front wheel-side control discontinuing flag $F_L$ is set at "0", while a left front wheel-side control discontinuing counting value $T_L$ is set at "0". When it is determined at Step S4 that $T_R < T_0$, the processing is advanced around Step S6 to Step S7.

When it is determined at Step S1 that the vehicle is not being turned leftwards, the processing is advanced to Step S8, at which it is determined whether the vehicle is being turned rightwards. When it is determined that the vehicle is being turned rightwards, it is determined at Step S9 whether the braking pressure control mode for the left front wheel brake $B_{FL}$ is the pressure increasing mode or the pressure maintaining mode. When the braking pressure control mode is the pressure increasing mode or the pressure maintaining mode, the left front wheel-side control discontinuing counting value $T_L$ is increased, for example, by 5 msec in the clocking means 15 at Step S10, and it is confirmed at next Step S11 whether the left front wheel-side control discontinuing counting value $T_L$ has become equal to or larger than the preset time $T_0$, e.g., 800 msec. On the other hand, when it is determined at Step S9 that the braking pressure control mode for the left front wheel brake $B_{FL}$ is not the pressure increasing mode or the pressure maintaining mode, i.e., when it is determined that the braking pressure control mode for the left front wheel brake $B_{FL}$ is the pressure decreasing mode, the left front wheel-side control discontinuing counting value $T_L$ is decreased, for example, by 1 msec in the clocking means 15 at Step S12, progressing to Step S11.

When it is determined at Step S11 that $T_L \geq T_0$, the left front wheel-side control discontinuing flag $F_L$ is set at "1". More specifically, the over-steering inhibiting control operation by the left front wheel brake $B_{FL}$ is discontinued, and at Step S14, the left front wheel-side control discontinuing flag $F_R$ is set at "0", while the right front wheel-side control discontinuing counting value $T_R$ is set at "0". When it is determined at Step S11 that $T_L < T_0$, the processing is advanced around Step S13 to Step S14.

When it is determined at Step S8 that the vehicle is not being turned rightwards, i.e., when it is determined that the vehicle is traveling straight, the right front wheel-side control discontinuing flag $F_R$, the right front wheel-side control discontinuing counting value $T_R$, the left front wheel-side control discontinuing flag $F_L$ and the left front wheel-side control discontinuing counting value $T_L$ are set at "0" respectively at Step S15.

The operation of this embodiment will be described below. The clocking means 15 clocks the continued state of the over-steering inhibiting control operation, and the control discontinuation determining means 16 determines the discontinuation of the over-steering inhibiting control operation in response to the fact that the counting value provided by the clocking means 15 reaches the preset time. A discontinuing signal is inputted from the control discontinuation determining means 16 to the control mode switching-over means 14, and in response to this, a control discontinuing signal is fed from the control mode switching-over means 14 to the braking liquid pressure control device 4, whereby the over-steering inhibiting control operation is discontinued. Thus, the time of continuation of the over-steering inhibiting control operation is long when the over-steering inhibiting effect is not obtained, and an excessive over-steering inhibiting control operation can be avoided by the fact that when the counting value $T_R$ or $T_L$ of the clocking means 15 for clocking the over-steering inhibition-controlled state has reached the preset time $T_0$, the over-steering inhibiting control operation is discontinued.

Moreover, the state in which the control mode switching-over means 14 has brought the braking pressure control mode for the wheel brake for the outer wheel (as viewed during turning of the vehicle) into the pressure increasing mode or the pressure maintaining mode, i.e., the state in which the control mode switching-over means 14 has brought the braking pressure control mode for the right front wheel brake $B_{FR}$ into the pressure increasing mode or the pressure maintaining mode during leftward turning of the vehicle and the braking pressure control mode for the left front wheel brake $B_{FL}$ into the pressure increasing mode or the pressure maintaining mode during rightward turning of the vehicle, is a state in which the braking force is being exhibited for the outer wheel (as viewed during turning of the vehicle). The continuation of such a state for a relatively long time is when the over-steering inhibiting effect has not been obtained. When the control mode is in the pressure decreasing mode, the braking force is being decreased for the outer wheel (as viewed during turning of the vehicle) on the basis of the fact that the over-steered state is being eliminated. Since the clocking means 15 is arranged so as to clock the state of continuation of the over-steering inhibiting control operation with a counting value per one run determined depending upon the control mode, the preset time $T_0$ is determined substantially depending upon the degree of the over-steering inhibiting effect. Thus, it is possible to more effectively prevent the excessive over-steering inhibiting control operation.

The clocking means 15 decreases the counting value $T_R$ or $T_L$, for example, 1 msec by 1 msec, when the control mode switching-over means 14 has brought the braking pressure control mode into the pressure decreasing mode. Therefore, even if the braking pressure control mode is brought into the pressure increasing mode or the pressure maintaining mode again after the braking pressure control mode has been temporarily brought into the pressure decreasing mode with a counter-steering operation carried out by the driver in the over-steered state, it is avoided that the over-steering inhibiting control operation is immediately discontinued, because the counting value $T_R$ or $T_L$ clocked in the state of the pressure increasing mode or the pressure maintaining mode is being decreased until the control mode is brought into the pressure decreasing mode. Thus, it is possible to prevent the over-steering inhibiting control operation from being frequently discontinued due to a variation in yaw rate γ caused by a counter-steering operation.

Although the preferred embodiment of the present invention has been described in detail, it will be understood that the present invention is not limited to the above-described embodiment, and various modifications may be made without departing from the spirit and scope of the invention defined in claims.

For example, the braking pressure for the wheel brake for the outer (as viewed during turning of the vehicle) one of the left and right front wheels which are the driving wheels, is controlled to an increased value during over-steering in the above-described embodiment, but the present invention is applicable to a system designed so that the braking pressure for the wheel brake for the outer (as viewed during turning of the vehicle) one of the left and right rear wheels which are the follower wheels, is controlled to an increased value during over-steering.

As discussed above, according to the present invention, the excessive over-steering inhibiting control operation can be avoided by the fact that the over-steering inhibiting control operation is discontinued in response to the counting value of the clocking means for clocking the over-steering inhibition-controlled state reaching the preset time. Moreover, the clocking means clocks the over-steering inhibition control-continued state with the counting value per one run determined depending upon the control mode and hence, it is possible to more effectively prevent the excessive over-steering inhibiting control operation.

According to the present invention, it is also possible to prevent the over-steering inhibiting control operation from being frequently discontinued due to a variation in yaw rate caused by a counter-steering operation.

What is claimed is:

1. An over-steering inhibiting control system for a vehicle, comprising:
    a control mode switching-over means for setting a braking pressure control mode in at least one of a pressure increasing mode and a pressure maintaining mode based on a braking pressure control quantity applied to an outer one of left and right wheel brakes of the vehicle, as viewed during turning of the vehicle, for over-steering inhibiting control;
    a clocking means for clocking the over-steering inhibiting control by increasing a counting value when the braking pressure control mode is at least one of the pressure increasing mode and the pressure maintaining mode; and
    a control discontinuation determining means for causing the control mode switching-over means to switch the braking pressure control mode to a pressure decreasing mode and discontinuing the over-steering inhibiting control when the counting value of the clocking means reaches a preset time value.

2. An over-steering inhibiting control system according to claim 1, wherein said clocking means decreases the counting value when the braking pressure control mode is in the pressure decreasing mode.

3. An over-steering inhibiting control system for a vehicle, comprising:
    a yaw rate sensor to detect a yaw rate of the vehicle;
    a target yaw rate determining means for determining a target yaw rate;
    a braking pressure control quantity calculating means for calculating a braking pressure control quantity for an outer one of left and right wheel brakes of the vehicle, as viewed during turning of the vehicle, based on said target yaw rate obtained in said target yaw rate determining means and said yaw rate detected by said yaw rate sensor, when the vehicle is in an over-steered state;
    a control mode switching-over means for switching over a braking-pressure increasing, maintaining and decreasing modes from one to another based on the control quantity obtained in said braking pressure control quantity calculating means to control a braking pressure for the wheel brake for the outer wheel as viewed during turning of the vehicle;
    a clocking means for clocking the state of continuation of the over-steering inhibiting control with a counting value per one run being determined depending upon the braking pressure control mode; and
    a control discontinuation determining means for forcibly discontinuing the over-steering inhibiting control operation in response to said counting value of said clocking means reaching a preset value, even during continuation of the over-steering inhibiting control operation.

4. An over-steering inhibiting control system according to claim 3, wherein said clocking means decreases said counting value by a predetermined value each time said control mode switching-over means switches the braking pressure control mode to the pressure decreasing mode.

5. An over-steering inhibiting control system for a vehicle, comprising:
    a yaw rate sensor to detect a yaw rate of the vehicle;
    a target yaw rate determining means for determining a target yaw rate;
    a braking pressure control quantity calculating means for calculating a braking pressure control quantity for an outer one of left and right wheel brakes of the vehicle, as viewed during turning of the vehicle, based on said target yaw rate and said yaw rate, when the vehicle is in an over-steered state;
    a control mode switching-over means for setting a braking pressure control mode in at least one of a pressure increasing mode and a pressure maintaining mode based on the braking pressure control quantity to control a braking pressure for the outer wheel brake for over-steering inhibiting control;
    a clocking means for clocking the over-steering inhibiting control by increasing a counting value by a first predetermined value when the braking pressure control mode is at least one of the pressure increasing mode and the pressure maintaining mode; and
    a control discontinuation determining means for causing the control mode switching-over means to switch the braking pressure control mode to a pressure decreasing mode and discontinuing the over-steering inhibiting control when the counting value of the clocking means reaches a preset time value.

6. An over-steering inhibiting control system according to claim 5, wherein said clocking means decreases the counting value by a second predetermined value which is less than the first predetermined value when the braking pressure control mode is in the pressure decreasing mode.

* * * * *